May 7, 1929.  S. KHALIL  1,712,113
METHOD, APPARATUS, AND SYMBOLS FOR RECORDING
AND INDICATING SOUND WAVES
Filed June 4, 1926  7 Sheets-Sheet 1

INVENTOR
SEYED KHALIL
BY
Joseph F. O'Brien
ATTORNEY

May 7, 1929.  S. KHALIL  1,712,113
METHOD, APPARATUS, AND SYMBOLS FOR RECORDING
AND INDICATING SOUND WAVES
Filed June 4, 1926   7 Sheets-Sheet 3

INVENTOR
SEYED KHALIL
BY
Joseph F. A. Quinn
ATTORNEY

Fig. 9.

May 7, 1929.  S. KHALIL  1,712,113
METHOD, APPARATUS, AND SYMBOLS FOR RECORDING
AND INDICATING SOUND WAVES
Filed June 4, 1926    7 Sheets-Sheet 6

INVENTOR
SEYED KHALIL
BY
Joseph F. O'Brien
ATTORNEY

Fig. 16.

1 SECOND   2 SECONDS   3 SECONDS   4 SECONDS
X WATTS    X WATTS     X WATTS     X WATTS

2 SECONDS   4 SECONDS   6 SECONDS   8 SECONDS
½ X WATTS   ½ X WATTS   ½ X WATTS   ½ X WATTS

3 SECONDS   6 SECONDS   9 SECONDS   12 SECONDS
⅓ X WATTS   ⅓ X WATTS   ⅓ X WATTS   ⅓ X WATTS

4 SECONDS   8 SECONDS   12 SECONDS   16 SECONDS
¼ X WATTS   ¼ X WATTS   ¼ X WATTS    ¼ X WATTS

Patented May 7, 1929.

1,712,113

UNITED STATES PATENT OFFICE.

SEYED KHALIL, OF NEWARK, NEW JERSEY.

METHOD, APPARATUS, AND SYMBOLS FOR RECORDING AND INDICATING SOUND WAVES.

Application filed June 4, 1926. Serial No. 113,704.

This invention relates to improvements in method, apparatus and symbols for recording and indicating sound waves.

One of the objects of this invention is to produce and record a characteristic graph, symbol or representation for any given sound which I shall term "phonophasograms".

Another object of my invention is the production of apparatus for converting or transforming into electric waves or vibrations of similar characteristics any air-wave or air-wave energy generated in the production of a given sound and directed against a sound-sensitive element of the apparatus, and to utilize such electrical energy or vibrations to cooperate with and actuate suitable mechanism, and preferably electromagnetic devices to causes to be recorded or traced on paper or other suitable medium by a pencil, stylograph or other suitable recording instrument or recorder, graphs, symbols or indications which will vary in characteristics in accordance with the varying characteristics of the air-waves directed against said sound-sensitive element. This device I shall term a "phonophasograph."

The principal characteristics of sound-producing air-waves whether simple or complex are the amplitude and the frequency thereof, and by the use of my apparatus, I am enabled to measure and record the amplitudes and frequencies of any such simple or complex air-wave and to indicate or record graphically by suitable graphs or symbols the values of such characteristics and the relationship of the same to each other, and to this end I provide a graph which will have for each sound-producing air-wave, distinguishable characteristics from those of any other sound-producing air-wave.

More particularly my invention comprises the use of apparatus which will accurately record graphs distinguishable from each other and which will vary in character in accordance with the frequency and amplitude of the sound-waves impinging against the sound-sensitive element, and this is preferably accomplished by converting or transforming any given sound-producing air-waves into electric waves or energy of similar character, such as similar amplitude and frequency, and these electric waves are utilized to actuate power devices, first, to produce a continuous line, the length of which will indicate the amplitude of the sound-waves so transmitted; secondly to produce a broken-line extending parallel to the continuous line and comprising a series of line-portions of varying size, the number, length and positioning of which in relation to the continuous line will indicate the freqeuncies of the sound-waves so transmitted; thirdly, to provide mechanism actuated by each electric wave or agitation to move the paper so as to provide new material on which recording may be continued; fourthly, to cause the continuous and broken lines to traverse simple sine curves of a predetermined length and depth, thus providing a unit of measurement and enabling the amplitude of the recorded graph or symbol to be more readily visualized and measured; and fifthly, to provide means for subdividing this sine curve unit of measurement to permit ready and accurate determination of the amplitude and frequency of the sound-wave represented by the recorded graph.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Referring now to these drawings which illustrate a preferred embodiment of my invention, I will first describe in a general way the elements of my improved sound-recording apparatus which I shall hereinafter refer to as a "phonophasograph" and will thereafter describe in detail the mechanical structures and electrical characteristics of such elements.

Generally speaking, my phonophasograph comprises a sound-sensitive element A, a circuit and mechanism A' for converting the sound impulses to electric impulses, a recording element B, a recording material C, electrical power means D, E and F for moving the recording element and material respectively, a power circuit, mechanism and contacts G for moving the recording element and material in accordance with the characteristics of the air-wave energy directed against said sound-sensitive element, and broadly speaking, I am enabled by the use of the device to produce or record symbols which will vary in characteristics in accordance with the varying characteristics of air-waves directed into the same, and I shall hereinafter for convenience call such symbols "phonophasograms".

In the preferred embodiment of my invention, the sound-sensitive element comprises the diaphragm of a transmitter 1 which is similar to the ordinary telephone transmitter. The transmitter 1, as shown, is connected up in a circuit with a battery 2 and electromagnet 3 and is mounted so that its weight depresses a hook 4 against the action of a spring $4^a$, said hook 4 being formed upon a bell-crank 4' pivoted at $4^b$ and having an arm provided with a terminal $4^d$ which, when the hook is in depressed position, moves a switch contact $4^e$ out of engagement with a contact $4^f$ to open the transmitter circuit. When the transmitter 1 is lifted from the hook the circuit $2^a$ through the switches $4^e$, $4^f$ is closed, causing, when the sound-sensitive element in the transmitter 1 is vibrated, current to flow through said circuit and induced currents to be produced in the electromagnet 3. I shall hereinafter term this circuit the converting means or converting circuit and mechanism.

The depression of the hook arm 4' by the weight of the transmitter also maintains in open position the switch contacts 5, 5' of a power-energizing circuit $6^a$ for the moving elements of my apparatus, all of which derive electric energy from the single battery 6 and are controlled by the characteristics of the impulses transmitted from the sound-sensitive element to the electromagnet 3.

As illustrated a contact shaft 7 is arranged adjacent to the electromagnet 3 and is provided with an arm $3^a$ which will constitute the armature of the electromagnet 3, the said armature being held in normally spaced relationship from said electromagnet 3 by the spring $3^b$. It will be noted that the mounting of this shaft and the electric and mechanical connections of said shaft 7 will cause it to be oscillated by the armature $3^a$ and that such oscillations will vary in accordance with the impulses passed through the transmitter circuit, and it will thus be seen, that the shaft 7 will be caused to have oscillations or vibrations of such magnitude, duration or varying character as will be caused by the impingement of sound-waves against the sound-sensitive element of the transmitter 1.

This contact shaft 7 is arranged in circuit with the battery 6 and has mounted thereon contacts, for energizing the power devices to move the recording element and recording material respectively.

It will be seen that the battery 6 is in circuit with the collars or bearings 8 and 9 carried by and insulated from the shaft 7. Each of these insulated collars or bearings have three contact arms $8^a$, $8^b$, $8^c$ and $9^a$, $9^b$ and $9^c$ respectively which contact with the power devices first for moving the recording element in accordance with the amplitude of the sound wave; secondly, for moving the recording-material escapement and thus to enable the recordation of successive amplitude graphs of the energizing sound-wave: and thirdly simultaneously to produce a broken line constituting a series of portions of varying length and number and in varying relationships to the continuous line so as to permit the recordation of the frequency of the energizing sound-waves.

The recording material in the preferred embodiment of my invention is moved a predetermined distance upon each movement of the shaft 7, and in said preferred embodiment of my invention, this is accomplished by the energizing by the contact arms 8$^b$, 9$^b$ of the circuit 67 having the terminals 68 and 69 and spring restrained contacts 68', 68$^a$ and 69', 69$^a$ respectively, and the magnet F, and the operation by said magnet, through the spring-pressed pawl 60 mounted on the spring-restrained armature 61 of said magnet F, of an escapement wheel 62 which is prevented from reverse movement by a pawl 63 mounted in stationary position on the bracket arm 64 which also supports the magnet F. The escapement wheel 62 drives a studded cylinder 65 arranged to engage and move, only in accordance with the movement of the escapement by the magnets, a perforated paper strip C held in engagement with the cylinder 65 by wheels 66, 66' and above which paper strip the recording element B is mounted and on which is caused to be recorded the aforesaid phonophasograms produced by my said apparatus. It will be understood that other mechanism may, if desired, be utilized for moving the paper to continuously provide a fresh record material or inscribing surface but such mechanism is preferably actuated by the converted electric energy which varies in accordance with the energy of the sound-wave directed into the transmitter as aforesaid, so that the movement of the paper will be timed with the movement of the recording instrument.

The recording element B preferably has two members comprising in the embodiment shown, lead pencils $b$ and $b'$ and I have provided means for actuating one of these elements to represent by a continuous line the amplitude of the energizing sound-wave and the other to indicate by a broken line the frequency of vibrations of such sound-wave.

Figure 1:
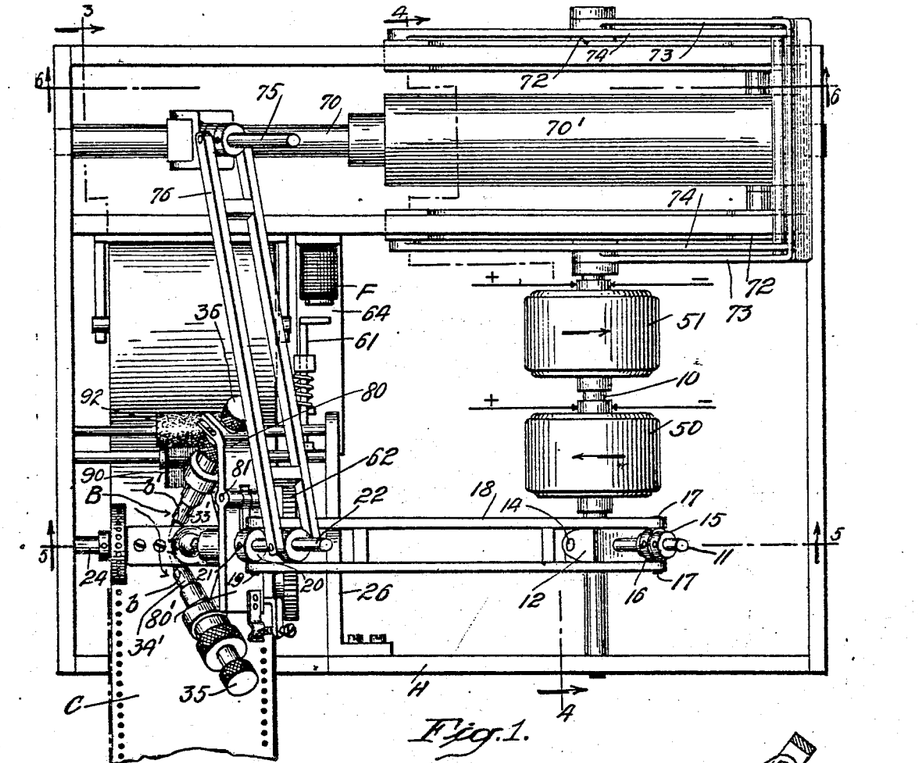
Fig. 1 is a plan view of a phonophasograph embodying my invention.
Figure 2:
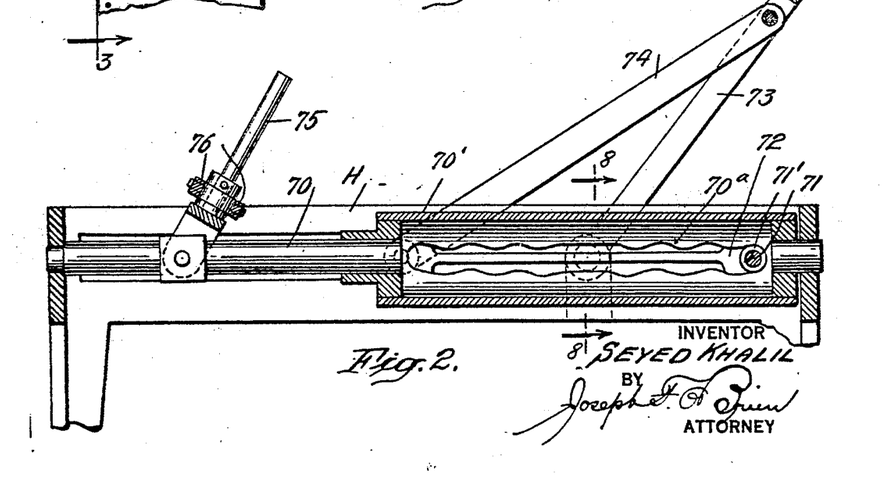
Fig. 2 is a section on the line 2—2 of Fig. 3, looking in the direction of the arrow.
Figure 3:
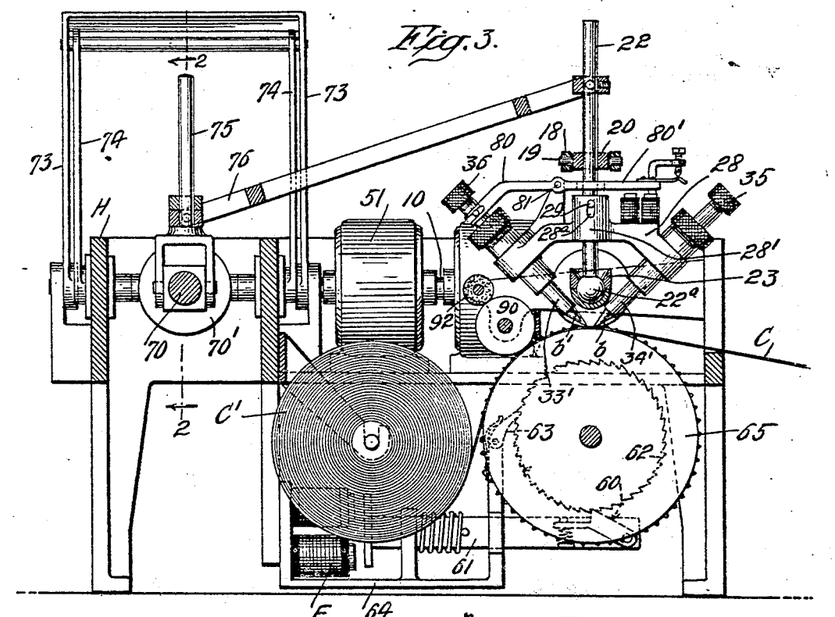
Fig. 3 is a section on the line 3—3 of Fig. 1, looking in the direction of the arrow.
Figures 4, 8:
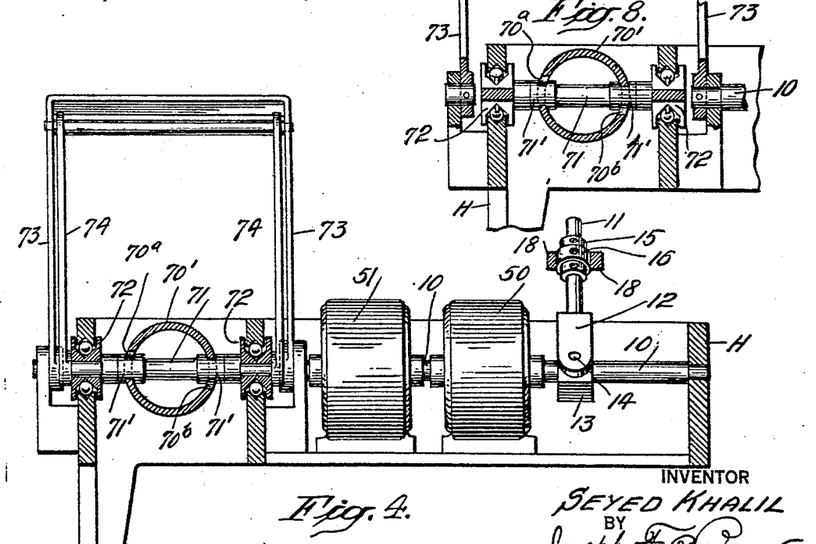
Fig. 4 is a section on the line 4—4 of Fig. 1, looking in the direction of the arrow.
Fig. 8 is a section on the line 8—8 of Fig. 2, looking in the direction of the arrow.
Figure 5:
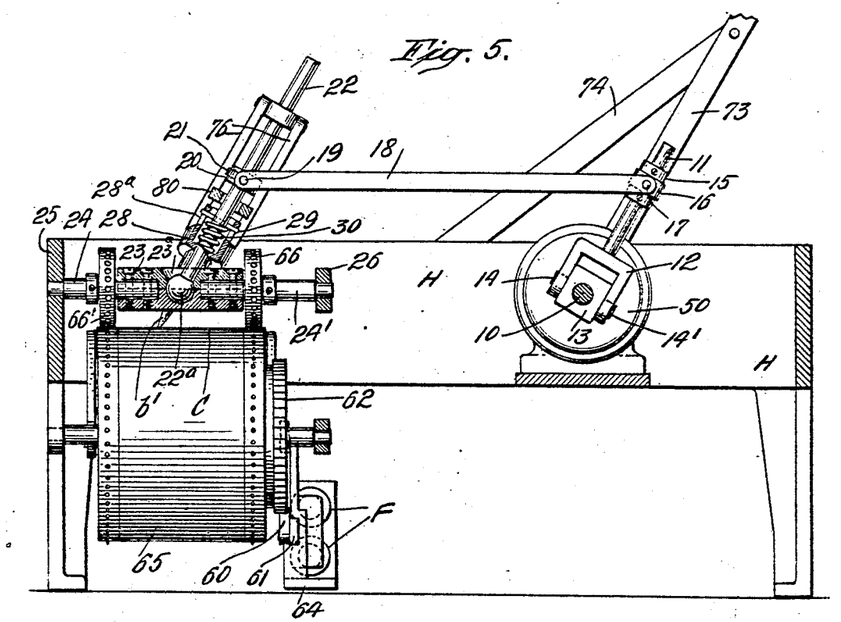
Fig. 5 is a section on the line 5—5 of Fig. 1, looking in the direction of the arrow.
Figures 6, 7:
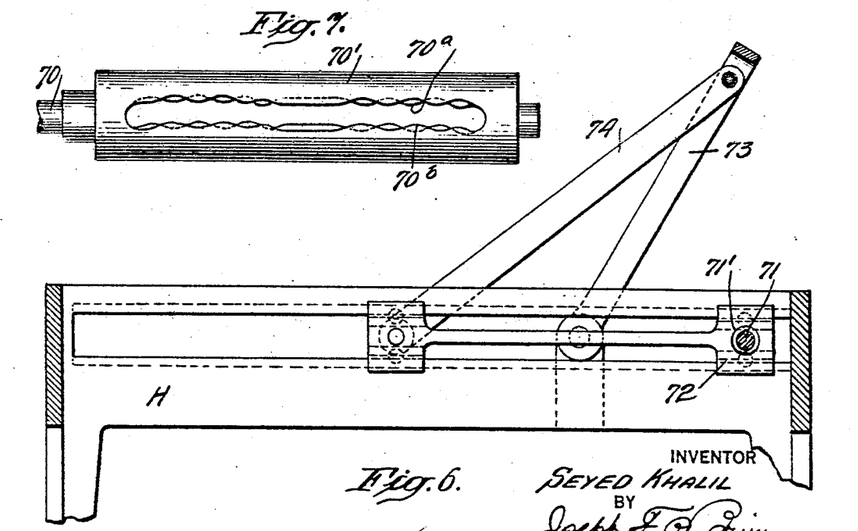
Fig. 6 is a section on the line 6—6 of Fig. 1, looking in the direction of the arrow.
Fig. 7 is a fragmentary side elevation of the symbol waving cylinder shown in Figs. 1 to 5.
Figure 9:
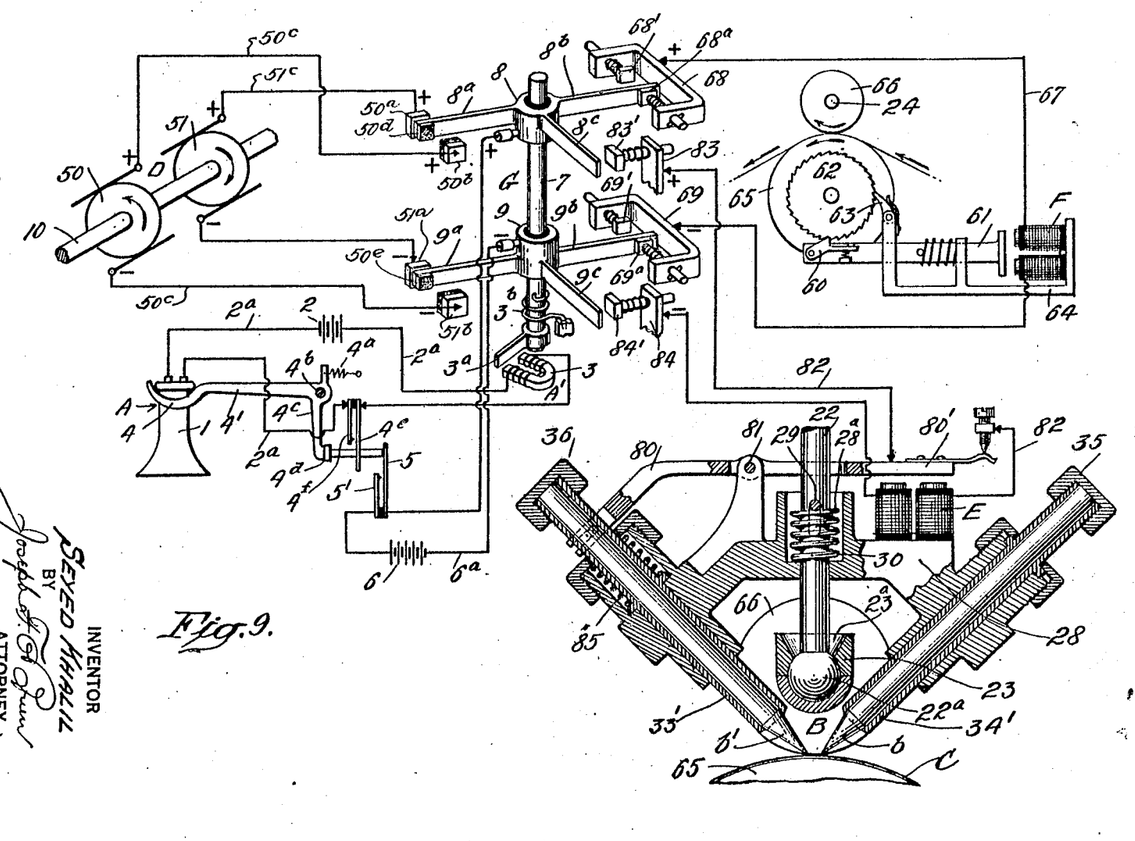
Fig. 9 is a diagrammatic view showing the electric wiring and connections between the transmitter and the mechanical apparatus for actuating the recorder, the same being illustrated in inoperative position with the circuits broken by the weight of the transmitter.
Figures 10, 11:
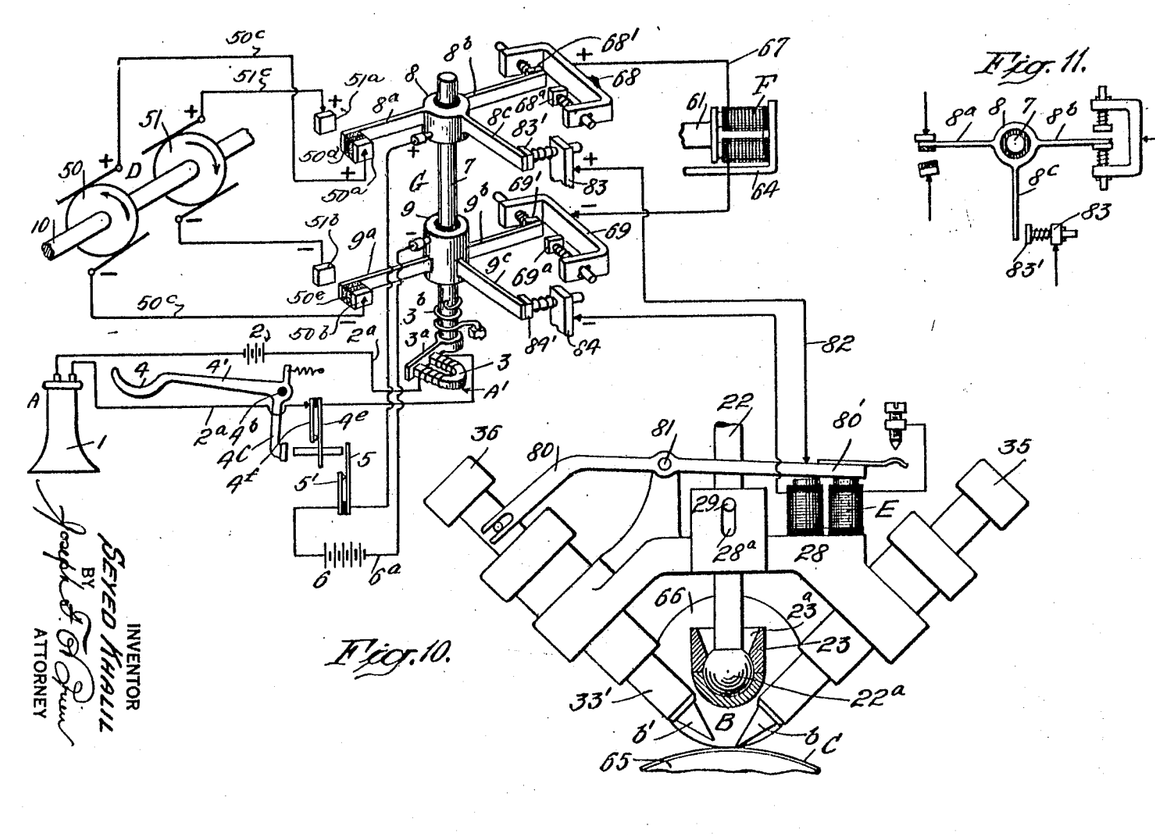
Fig. 10 is a view similar to Fig. 9 showing the same connections in operative or writing position with the circuits closed and the diaphragm of the transmitter vibrated to begin recording and the other one is in inoperative position and in non-writing position.
Fig. 11 is a view, in plan, of the arms and connections showing the positions of the parts as indicated in Fig. 9.
Figure 12:
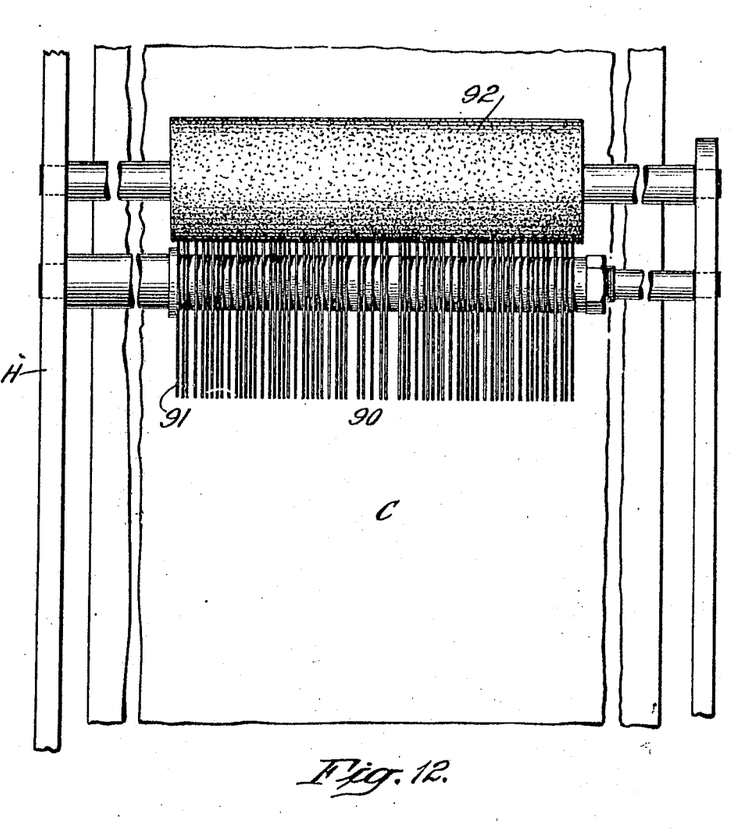
Fig. 12 is a view, in plan, of the ruling mechanism embodying my apparatus.
Figure 13:
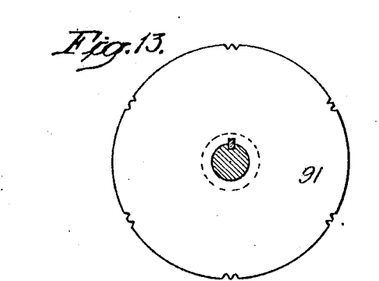
Fig. 13 is a section showing one of the ruling discs embodied in said ruling mechanism.
Figure 14:
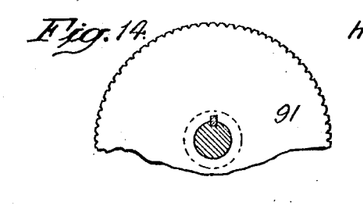
Fig. 14 is a similar view of another disc embodied in my said ruling mechanism.
Figure 15:
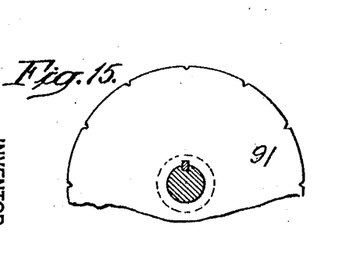
Fig. 15 is a similar view of still another form of disc embodied in my said ruling mechanism.

The power-actuating devices for moving together or jointly both members of the recording element constitute the motors 50 and 51. These motors are energized by the contacts 8$^a$ and 9$^a$ respectively. It will be seen from an examination of the diagrammatic views of Figs. 9 and 10 respectively, that the contact arms 8$^a$ and 9$^a$ will, upon the attraction of the arm 3$^a$ comprising the armature of the electromagnet 3, be caused to move into the position indicated in Fig. 10 so as to make contact with the terminals 50$^a$, 50$^b$ of the circuit 50$^c$ for the motor 50 and that when the armature 3$^a$ is released from attraction by the electromagnet 3 the shaft will be oscillated in the opposite direction by the spring 3$^b$ and the contact arms 8$^a$, 9$^a$ will thereupon be moved in the opposite direction and into contact with the terminals 51$^a$, 51$^b$ in the circuit 51$^c$ of the motor 51. The motors 50 and 51 are mounted upon a shaft 10 to oscillate or drive the same in opposite directions when the contact arms 8$^a$, 9$^a$ respectively are moved into contact with the respective terminals thereof. The shaft 7 is moved, as aforesaid, by the electromagnet 3 and spring 3$^b$ respectively and consequently will oscillate and drive suitable power-transmission elements which transmit movement to the recording element.

It will be seen that the motor 50 is driven during the attraction of the arm 3$^a$ by the electromagnet 3 and will, therefore, be moved only with an electrical impulse corresponding to a sound impulse directed against the sound-sensitive element and transmitted through the energizing circuit.

In order to cause variation of the amplitude indicating movements of the shaft 10 in accordance with the amplitude of the impulse, I have included in the circuit 50$^c$ between the contact arm 8$^a$, 9$^a$ respectively and the terminals 50$^a$, 50$^b$ respectively, resistances variable by pressure, such as the carbon piles 50$^d$, 50$^e$ which will be compressed in varying degrees in accordance with the strength of the electric impulse passing through the electromagnet 3 so that the shaft 10 will thus be caused to have what I shall term a series of amplitude oscillations which will vary in exact accordance with the variation of the electric impulses and consequently will also vary in accordance with the sound-wave impulse directed against the sound-sensitive element or transmitter. The opposite movement of the arms 8$^a$, 9$^a$ which contact with the terminals 51$^a$ and 51$^b$ respectively of the circuit 51$^c$ for the motor 51, merely cause the movement of the shaft 10 back to initial position and are not, therefore, provided with carbon piles for varying the degree of driving impulse passing through the motor.

These motors drive or oscillate the shaft 10, the movement of which is transmitted to the recording element as above indicated. This motion of the shaft 10 is preferably transmitted by a plurality of transmission members arranged in angular disposition to each other so as to avoid lost motion and promote accuracy of movement.

This motion of the shaft 10 is also preferably transmitted to the recording element to cause the same to traverse a partially straight and partially sinuous path so as to record or inscribe outlines of partially sinuous shape or configuration, and preferably to cause one of the members to record an outline for each sound-wave comprising one or a series of sine curves separated by a straight portion.

The said shaft is, as shown, journalled in a frame H. On this shaft 10 is mounted a rocking element which, as shown, comprises a post 11 having at its lower end a fork portion 12 pivotally mounted on a block 13 to allow movement parallel to the shaft 10 but to cause a rocking motion at right angles to said shaft when the same is oscillated as hereinafter described. As illustrated, the fork portion 12 is pivoted to the block 13 by pins 14, 14'. The upper end of the post 11 is provided with a sleeve 15 fastened thereto on which is mounted a loose collar 16 to which is pivotally mounted by pins 17 a horizontal member 18 which, upon the rocking of the shaft 10, transmits the oscillatory movement of said shaft to the recording element. This recording element has a similar pivotal connection with said transmission member by means of pins 19, and collar 20 fastened by a screw 21 to a post 22 mounted for universal movement in a block 23 preferably by providing at the lower end thereof a ball 22$^a$ and providing the block 23 with a ball 23$^a$. The socketed block 23 is fast upon stub shafts 24, 24' suitably supported from rails 25 and 26 of the frame 1 and the ball socket 23$^a$ is preferably centrally located in said block so that the center thereof and of the ball mounted therein will register or coincide with the axis of the stub shafts 24, 24'. Said block 23 is positioned directly over a movable recording material C comprising a strip of perforated paper moved as hereinabove set forth. The post 22 comprises the oscillating member of the recording element and carries at its lower end a holder yoke 28 which is resiliently mounted thereon and, as shown, is provided at its middle portion with a sleeve 28' slidably mounted on said post and provided with longitudinal slots 28$^a$ within which the ends of pins 29 carried by the post 22 extend, the sleeve 28$^a$ being hollowed out and having, as shown, a coil spring 30 pressing at its opposite ends against the pin and the bottom of the hollow holder sleeve 28' so that the entire holder yoke 28 will normally be pressed downwardly. Said holder 28, as illustrated, is provided at opposite sides of the post with pencil bearings 31 and 32 which are adjustably mounted, pencils or other tracing elements $b$ and $b'$ respectively. In the preferred form of my invention, the pencils $b$ and $b'$ are mounted in sleeves 33', 34' which in turn are mounted in the pencil mountings 31 and 32 of the holder yoke 28. The pencil is preferably adjustable in the sleeve by means of caps 35 and 36 and it will be seen that because of the action of the spring 28' within the holder yoke 28, both of the pencils will be resiliently moved against the recording material. Because of the mounting of the pencils and the fact that the said holder parts are resiliently pressed downwardly in relation to the said post 22, it will be seen that the pencils will be resiliently pressed downwardly against the recording material by the action of the spring 28'.

From the above, it will be apparent that the movements of the shaft 10 will be transmitted to the recording element; that the recording element will record graphs on the recording material, and that because of the fact that one of the movements of the shaft 10 varies in exact accordance with the variation of electrical energy produced by the product of the time of duration and strength of the electric impulse converted or transformed by the actuation of the sound-wave on a sound-sensitive element in a converting circuit, the graph produced will represent the amplitude of the sound-wave.

In order to measure these graphs or to visualize the length thereof, I preferably cause the recording element to traverse a part sinuous and part straight line path and thus to cause the graphs recorded to be divided up into sine curves and straight lines. My preferred means for accomplishing this result comprises the provision of a shaft 70 disposed at right angles to the shaft 10 and arranged to be rocked by a travelling or reciprocating rod or member 71, which is in turn, caused to travel by the oscillations or motion of the shaft 10. As shown, the member 71 is provided with antifriction rollers 71$^a$, mounted in a carriage 72 and passes through a hollow cylindrical portion 70' having in opposite walls sinuous slots 70$^a$, 70$^b$ having curved outlines of similar amplitude or length but of opposite phase disposition, the rollers 70$^a$ being in engagement with the edges of said slot 72 so that movement of the carriage rocks the shaft 70. The carriage 72 is moved by the shaft 10, the motion being amplified by causing a relatively long bridge piece 73 to be rocked by said shaft 10 and pivotally connecting the other end of said bridge by pivoted rods 74 with the travelling carriage 72.

This sinuous movement of the shaft 70 is transmitted to the recording element by a post 75 and transmission element 76 similar to that hereinabove described for transmitting direct oscillations of the shaft 10.

It will be seen, therefore, that by the provision of transmitting elements at right angles to each other, I not only provide for the division of the amplitude lines into sine curves but also produce a pantograph arrangement which promotes accuracy and enables amplification of the movement of the recording element.

The frequency of the sound-wave is reproduced and recorded by the member or pencil $b'$ which is continuously vibrated by the lever 80 pivoted at 81 and the opposite end 80' of which constitutes the armature of the magnet E, said magnets and armature being in the circuit 82 having the terminals 83 and 84 respectively provided with resilient contacts 83', 84'. These contacts 83', 84' as it will be seen from an examination of Figs. 9 and 10 will be pressed by the contact arms 8ᶜ, 9ᶜ respectively to close the circuit when the electromagnet 3 is energized to attract its armature 3ᵃ. The current in the said circuit 82 will thus cause the member b' to be vibrated up and down against action of the spring 85 during the carriage of the recording element B through the length of the amplitude recording movement and thus the frequency recording element b' will produce on the recording material a series of broken line portions which will vary in number, extent and in relationship to the continuous line having sine curves recorded by the amplitude elements b.

It will be seen that the frequency of the recording vibrating circuit as well as the escapement operating circuit and the circuit for producing the amplitude movement, all derive current from the same battery 6 and, therefore, the energizing current in each of the circuits will be identical for each circuit.

It will also be noted that the vibrations of the frequency recording element b' will be of a predetermined period and that this element will, therefore, touch the paper or recording material for a predetermined interval during each vibration and also that because of the slowness or rapidity of the movement of the recording element B as a whole, the said member b' will produce on the paper a broken line the portions of which will be of greater or less length in accordance with the speed of movement of the recording element B and, furthermore, that in view of the fact that the amplitude recording member b carried by the recording element produces a continuous line during its entire movement, the line produced by the frequency recording element b' will be placed in relation to said line in varying positions throughout its length. Furthermore, that the movement of the recording element B as a whole to cause said element b to produce sine curves and the fact that the frequency recording element b follows the same path, these broken line portions will be arranged in varying positions with relation to these sine curves, the result being that a graph or symbol will be formed for each sound-producing air-wave which will have characteristics distinguishable from those of any other sound-producing air-wave.

The division of the continuous amplitude recording graph into a series of continuous sine curve portions forms a convenient divisional unit and enables a quicker visualization of the length of the recorded amplitude line.

It is, in some cases, desirable to further subdivide the adjacent sine curve unit and for this purpose I preferably provide means for producing on the paper a series of longitudinal lines which will intersect both the continuous sinuous amplitude recording line and the broken frequency recording line and enable further subdivision of the said units. In the preferred embodiment shown these longitudinal subdividing lines are produced on the paper by providing a ruling element 90 comprising a series of discs 91 inked by an inking roller 92 and adapted to contact with the paper at one side of the recording element and, as shown, to rule the paper with a series of longitudinal subdivision lines, each series preferably being co-extensive in width with a sine curve and preferably comprising full lines at opposite edges of a curve a dot and dash line through the middle, relatively long dash lines at opposite sides of said middle line and fine dash lines between said long dash lines and the outer full lines. It will thus be seen from an examination of Figs. 12–16 that I am thus enabled to subdivide the sine curves and thus to more accurately determine the relationship and position of the line portions indicating frequency and the continuous sine curve portions indicating amplitude.

Figure 16:
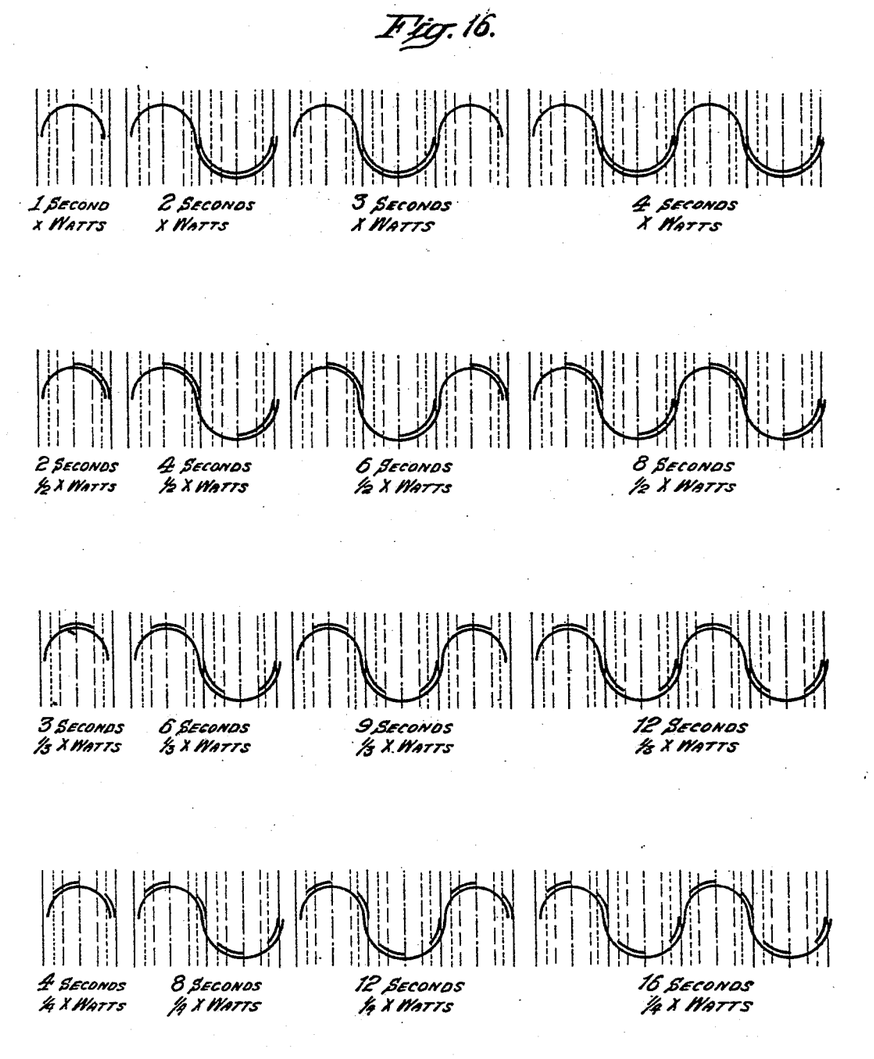
Fig. 16 is a chart showing a series of graphs such as produced by the use of my said apparatus.

Let us assume that in all of the following examples the period of the frequency element is such that one second of time is consumed while it is lifted from the paper and that it remains in contact with the paper also for one second of time. Now suppose the amplitude mechanism causes the recording element as a whole to move forward in one second of time with one X watt applied thereto. During that entire time, the amplitude mechanism will trace one sine curve as shown in Fig. 16 while in that same period of one second the frequency member will be lifted from the paper, and there will be no symbol of frequency. Now suppose one-half X watt is applied to the amplitude mechanism for two seconds of time, the length of the amplitude line or the sine curve will be the same as above mentioned, viz. one single sine curve will be produced. In this case, however, there will be a symbol of frequency starting from the middle of the sine curve to the end thereof because when the pencil of amplitude has started to trace, the pencil of frequency will be lifted from the paper for one second portion of the time and during that one second the pencil of amplitude, will write one-half sine curve. At this time, the element of frequency will come into contact with the paper and during the next second the element of frequency, remaining in contact with the paper will make a line parallel to the symbol of amplitude and of half the length thereof.

Let us assume again that one-third X watts is applied to the amplitude mechanism in three seconds of time. There will thus again be inscribed a sine curve similar in all respects to that hereinabove referred to. In this case, however, during the first second the frequency element will be lifted from the paper, during the 2nd second it will contact with the paper to make a parallel line at the middle portion of the sine curve and during the 3rd second it will be lifted from the paper so as not to trace at the end thereof and I will, therefore, have a symbol such as shown in the third line of the first longitudinal row in said Fig. 16.

If, now, we apply one-fourth X watts to said amplitude mechanism for four seconds of time, the result will again be a single amplitude sine curve while the frequency element will be lifted from the paper during the first and third seconds of the time and will be in contact with the paper during the 2nd and 4th seconds of time so as to produce the two symbols shown in the fourth line of said first longitudinal row in said diagrammatic view.

As another example of the variations in number, length and relative positioning of the symbols, I have also shown an example in the first line of the second longitudinal row of said figure in which one X watt is applied for two seconds of time so as to produce two sine curves, the period of vibration of the frequency line being always one second. In this case, during the first second, the frequency element will be out of contact with the paper so that no frequency line is made while one of the amplitude sine curves are being traced, while it will contact with the paper during the 2nd second while the other amplitude line is being traced, and a frequency line co-extensive with the said second sine curve will be traced.

I have also shown for illustration purposes merely, only eleven additional examples of symbols or graphs which may be produced by varying ampitudes and frequency periods.

In these views it will be seen that the longitudinal sub-division lines materially assist in indicating the positioning of the frequency symbols in relation to the amplitude symbols.

By "symbol of frequency" I do not, therefore, mean the broken or intermittent line only, but also the blank spaces which appear in the normal path of said intermittent line, and which are adjacent to and limited by the continuous line whether such blank space be coextensive with a continuous line or a sine-curve portion thereof, or whether it be a space between broken-line portions or spaces after or before a portion of the broken line as limited by the continuous line. The extent and number of blank spaces thus also constitute a part of the symbol of frequency. Hence the sum of the number of intermittent line portions and such blank spaces as so limited indicate the number of units of a predetermined arbitrary time consumed in the duration of impulse, which unit of time I shall call the "unit of frequency". For instance, the symbol shown at the left side of the first row in Fig. 16, being made with a single sine curve and without any broken-line graph portion, has a frequency of one unit because there is one blank space, while the symbol shown at the left side of the second row in Fig. 16, being formed of one sine curve with one broken-line portion at its right half, has a frequency of two units because there is one broken-line portion and one blank space. Again the symbol shown on the left side of the third row in Fig. 16 with one broken-line portion at its center indicates a frequency of three units, because there is one broken-line portion and two blank spaces, one on each side of that broken-line portion.

These units of frequency can be used as a basis for the determination of the strength of impulse used in the tracing of the continuous line of the graph. That is, as I have heretofore stated, the length of the continuous graph line varies in accordance with the variation of electrical energy produced from the product of time of duration and strength of the impulse. Now, knowing the time of duration of impulse, I can, by noting the number of arbitrary units of frequency, find the strength of the impulse used. To do so, I adopt a scale of dimension for measuring the length of the continuous graph line. The unit of the said scale of dimension must correspond to the distance travelled by the recording element during one of the said arbitrary units of frequency while using one unit of electric energy which, I will, as in the previous example, call an X watt. In fact, the said scale of unit of dimension may be a portion of the continuous graph line itself, provided that its length corresponds with one X watt and one unit of frequency. Thus, to find the strength of impulse used in tracing a continuous graph of any length, find out, first, how many units or fractions of a unit of the adopted scale is contained in the entire length of the continuous graph under consideration and then divide the total of these units of length by the total units of frequency of that particular graph and the result will represent the strength of the impulse used in tracing that graph.

For instance, suppose, as in the preceeding example, a sine curve is traced by the cooperation of one unit of time (a second) and one unit of electric energy (one X watt) as shown at the left side of the first row of graphs in Fig. 16 and I take that sine curve as the unit of length. Now, let us find out the strength of impulse used in tracing the sine curve at the left side of the second row of Fig. 16: Knowing that the length of this sine curve is equal to one unit of scale of dimension and knowing also that the frequency of this sine curve is two units of ar- ......ary time, as seen in the figure, I may by dividing one (the unit of length) by two (the unit of time) reach the result, one-half showing that one half of an X watt is used to trace the said sine curve. Again, the sine curve at the left side of the third row in Fig. 16 is equal to one unit of length and there is on this graph line three units of frequency viz. two blank spaces and a broken line portion. By dividing one by three, the result is one third, showing one third of an X watt is used to trace that sine curve. As still another example, let us find the impulse used in tracing the double sine curve on the second row in Fig. 16. It is twice as long as a single sine curve adopted as a unit of length; hence it is two units of length. Divide this number two by four, which is the number of units of frequency shown by this symbol, and the result will be one half, indicating that one half of a watt is used in tracing this double sine curve.

My phonophasograms or graphs which, as above shown, may be obtained automatically by vibration of sound transmitted through my phonophasograph, may be utilized as a code, and may be used for any purpose for which a code can be used.

It will be noted that the outline of this code or series of phonophasograms is in fact entirely different from the outline of the various codes actually in use, and that for any sound the outline of the phonophasogram always comprises two parallel symbols. One of these symbols is always a continuous line while the other is always a broken line arranged parallel to the continuous line and preferably each of these lines follow a sinuous path, the continuous line forming one or a series or a fraction of sine curves, and the broken line having a relationship in number, length and position with reference to said continuous line and also with reference to the sine-curve portions thereof.

The uses to which these phonophasograms or code may be put can be divided into classes (a) systematic and (b) mechanic.

Thus, in using my phonophasograms or code systematically, a method may be adopted to interpret these symbols in a manner similar to that in which the symbols of stenography are interpreted. In other words, the phonophasograms or code may be used as a new system of stenography.

In using my phonophasograms or code mechanically, these symbols can be used to actuate automatically any mechanical contrivances which are actuated or can be actuated by a conventional code, such as, for instance, the actuation of an automatic typewriting machine which prints the telegram by the insertion of a perforated telegraphic code.

Having described my invention, I claim:

1. The method of sound recordation consisting in converting the elements of sound-wave energy into a plurality of types of electric wave energy having distinctive characteristics and then cooperatively utilizing said plural types of electric wave energy to recompose said elements of sound-wave energy into arbitrary recorded symbols of standard characteristics.

2. The method of sound recordation consisting in converting sound-wave energy into a plurality of types of electric wave energy having distinctive characteristics and then cooperatively utilizing said plural types of electric wave energy to record on a recording material symbols varying in characteristics in accordance with the variations of the said plurality of types of electric wave energy, one of the characteristics of said symbol comprising an arbitrary mark varying in accordance with the variation of the electric energy produced by the product of the time of duration and the strength of a converted electric impulse.

3. The method of sound recordation consisting in converting sound-wave energy into a plurality of types of electric wave energy having distinctive characteristics and then cooperatively utilizing said plural types of electric wave energy to record on a recording material symbols varying in characteristics in accordance with the variations of the said plurality of types of electric wave energy, the said symbols comprising a mark of arbitrary form varying in dimensions in accordance with the variation of the strength of a converted electric impulse and also varying in accordance with the variation of the time of duration of the impulse of said converted electric wave energy.

4. The method of sound recordation consisting in converting sound-wave energy into a plurality of types of electric wave energy having distinctive characteristics and then cooperatively utilizing said plural types of electric wave energy to record on a recording material symbols varying in characteristics in accordance with the variations of the said plurality of types of electric wave energy, one of the characteristics of said symbols comprising a mark of arbitrary form varying in dimensions in accordance with the variation of the electric energy produced by the product of the time of duration and the strength of a converted electric impulse and another of said characteristics comprising a mark varying in accordance with the variation of the time of duration of the impulse of said converted electric wave energy and arranged in cooperative relationship with said first mark to have portions varying in number, length and position with respect thereto.

5. The method of sound recordation consisting in converting sound-wave energy into electric wave energy of similar characteristics, causing said electric wave energy to actuate a device having a component motion which is subjected to the variation of characteristics of said electric wave energy, and utilizing cooperatively the component parts of said component motion to record on a recording material symbols having characteristics varying in dimension and relationship in accordance with the variation of characteristics of said electric wave energy.

6. The method of sound recordation consisting in converting sound-wave energy into electric wave energy, the provision of a recording material and a recording device having a plurality of tracing members moving said recording element over said recording material and controlling the movement of said electro-magnetic device by said converted electric wave energy to cause said movement to vary in accordance with the variations of said electric wave energy and causing one of the said members of the recording element to have a periodic vibrating movement simultaneously with the tracing movement of said recording element.

7. The method of sound recordation consisting in converting sound-wave energy into a plurality of types of electric wave energy, controlling power devices individually by each type of electric wave energy to produce a symbol portion and arranging said symbol portions cooperatively to indicate the amplitude and frequency of sound-wave energy.

8. Apparatus for recording sound-waves embodying, in combination, a sound-sensitive element, a recording element, a recording material, and means for causing the recording element to record on the recording material cooperative symbols having portions, one of which varies in characteristics in accordance with the strength and duration of the converted electric waves and another of which varies in accordance with the duration only of such waves.

9. Apparatus for recording sound waves embodying, in combination, a vibratile sound-sensitive element, a recording element, a recording material, electro-magnetic means for converting sound-wave energy vibrating said sound-sensitive element into electric wave energy and means for controlling said electro-magnetic devices by said converted electric wave energy to cause said recording element to be variably moved in relation to said recording material in accordance with the variations of said electric wave energy.

10. Apparatus for recording sound waves embodying, in combination, a vibratile sound-sensitive element and a recording element having a plurality of recording members, a recording material, electro-magnetic means for causing said recording element to have a graph tracing movement and also for causing one of the members of said recording element to have a periodic vibrating movement, means for converting sound-wave energy, vibrating said sound-sensitive element into electric wave energy and means for controlling said electro-magnetic devices by said converted electric wave energy to move said recording element on said recording material in accordance with the variations of said electric wave energy and simultaneously to vibrate said periodic vibrating member into and out of contact with the recording material.

11. Apparatus for recording sound waves embodying, in combination, a vibratile sound-sensitive element and a recording element having a plurality of recording members, a recording material, electro-magnetic means for causing said recording element to have a graph tracing movement and also for causing one of the members of said recording element to have a periodic vibrating movement, means for converting sound-wave energy, vibrating said sound-sensitive element into electric wave energy and means for controlling said electro-magnetic devices by said converted electric wave energy to move said recording element and said recording material in accordance with the variations of said electric wave energy and simultaneously to vibrate said periodic vibrating member into and out of contact with the recording material and electro-magnetic means also controlled by said converted electric wave energy for moving the recording material simultaneously with the graph tracing and vibrating movements of the recording element.

12. Apparatus for recording sound-waves embodying, in combination, a vibratile sound-sensitive element, a recording element having a plurality of recording members, a recording material, electro-magnetic means for moving said recording element and for moving said recording material relatively to each other, electro-magnetic means for causing one of the members of said recording element to have a simultaneous periodic vibrating motion, means for converting sound-wave energy, vibrating said sound-sensitive element into electric wave energy, and means for controlling both of said electro-magnetic means by said converted electric wave energy to cause a graph tracing movement of said recording element on said recording material in accordance with the variations of said electric wave energy.

13. Apparatus for recording sound-waves embodying, in combination, a vibratile sound-sensitive element, a recording element having a plurality of recording members, a recording material, electro-magnetic means for moving said recording element and recording material relatively to each other to produce a graph tracing movement, electromagnetic means for causing one of said recording elements to have a periodic vibrating motion into and out of contact with the recording material during said graph tracing movement and an electric circuit having a single source of electric energy for jointly energizing said electro-magnetic means and another electric circuit connected with said sound-sensitive element to transform sound-waves vibrating said sound-sensitive element into electric waves of similar characteristics and means for controlling the movement of said electro-magnetic devices in accordance with the variations of the electric wave energy passing through said converting circuit.

14. Apparatus for recording sound-waves embodying, in combination, a vibratile sound-sensitive element, a recording element having a plurality of recording members, a recording material, electro-magnetic means for moving said recording element and recording material relatively to each other to produce a graph tracing movement, electromagnetic means for causing one of said recording elements to have a periodic vibrating motion into and out of contact with the recording material during said graph tracing movement and an electric circuit having a single source of electric energy comprising a single battery for jointly energizing said electro-magnetic means and another electric circuit connected with said sound-sensitive element to transform sound-waves vibrating said sound-sensitive element into electric waves of similar characteristics and means for controlling the movement of said electro-magnetic devices in accordance with the variations of the electric wave energy passing through said converting circuit.

15. Apparatus for recording sound-waves embodying, in combination, a vibratile sound-sensitive element, a recording element, a recording material, an electric circuit for converting sound-waves into electric waves of similar characteristics, power devices, and a power energizing circuit controlled by said converting circuit for actuating said power devices to variably move the recording element and recording material relatively in accordance with the variations of electric energy passing through said converting circuit.

16. Apparatus for recording sound-waves embodying a sound-sensitive element, a recording element, a recording material, an electric circuit connected with said sound-sensitive element for transforming sound-waves into electric waves of similar characteristics, electro-magnetic power devices, a power energizing circuit controlled by said converting circuit for actuating said power devices to variably move the recording element and recording material relatively in accordance with the variations of said electric impulse passing through said converting circuit, said recording element comprising two members one arranged to produce a continuous line varying in length in accordance with the length and strength of the converted electric waves to indicate the amplitude of the sound-wave and the other having a vibrating movement arranged to produce broken lines adjacent to said continuous line to indicate the frequency of the sound-wave.

17. Apparatus for recording sound-waves embodying, in combination, a sound-sensitive element, a recording element, a recording material, an electric circuit connected with said sound-sensitive element for transforming sound-waves into electric waves of similar characteristics, electro-magnetic power devices, a power energizing circuit controlled by said converting circuit for actuating said power devices to variably move the recording element and recording material relatively in accordance with the variations of said electric impulse passing through said converting circuit, said recording element comprising two members one arranged to produce a continuous line varying in length in accordance with the length and strength of the converted electric waves to indicate the amplitude of the sound-wave and the other having a periodic vibrating movement arranged to produce broken lines adjacent to said continuous line to indicate the frequency of the sound-wave.

18. Apparatus for recording sound-waves embodying, in combination, a sound-sensitive element, a recording element and a recording material, an electric circuit for converting sound-waves into electric waves of similar characteristics, electro-magnetic power devices, and a power-energizing circuit embodying a resistance element variable by pressure, and controlled by said converting circuit for actuating said power devices to variably move the recording element and recording material relatively in accordance with the variations of said electric impulse passing through said converting circuit, said recording element comprising two members one arranged to continuously contact with the recording material to produce a continuous line varying in length in accordance with the length and strength of the converted electric waves to indicate the amplitude of the sound wave and the other having a vibrating movement arranged to produce broken lines adjacent to said continuous line.

19. Apparatus for recording sound-waves embodying, in combination, a sound-sensitive element, a recording element and a recording material, an electric circuit for converting sound-waves into electric waves of similar characteristics, power devices, and a power-energizing circuit embodying a carbon resistance variable by pressure and controlled by said converting circuit for actuating said power-devices to variably move the recording element and recording material relatively in accordance with the variations of said electric impulse passing through said connecting circuit, said recording element comprising two members one arranged to continuously contact with the recording material to produce a continuous line varying in length in accordance with the length and strength of the converted electric waves to indicate the amplitude of the sound-waves and the other having a vibrating movement arranged to produce broken lines adjacent to said continuous line.

20. Apparatus for recording sound-waves embodying, in combination, a sound-sensitive element, a recording element and a recording material, an electric circuit for converting sound-waves into electric waves of similar characteristics, electro-magnetic power devices, and a power energizing circuit including a carbon resistance variable by pressure and also having a contact member cooperating with said carbon variable resistance and moved by the said converted electric waves to press against said resistance element with varying force in accordance with the actuating wave, said recording element comprising two members one arranged to continuously contact with the recording material to produce a continuous line varying in length in accordance with the length and strength of the converted electric waves to indicate the amplitude of the sound-wave and the other having a vibrating movement arranged to produce broken lines adjacent to said continuous line.

21. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, magnetic means in said circuit for oscillating said oscillatory contact shaft by the converted electric waves in said circuit, electro-magnetic power means for causing said relative movement of said recording element and recording material and an energizing circuit for said electro-magnetic power means controlled by the movement of said oscillatory contact shaft whereby said relative movement will be caused to vary in accordance with the variations of electric energy passing through said converting circuit.

22. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, magnetic means in said circuit for oscillating said oscillatory contact shaft by the converted electric waves in said circuit, electro-magnetic power means for causing said relative movement of said recording element and recording material and an energizing circuit for said electro-magnetic power means controlled by the movement of said oscillatory contact shaft and a resistance in said energizing circuit variable by pressure, whereby said relative movement will be caused to vary in accordance with the variations of electric energy passing through said converting circuit.

23. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, magnetic means in said circuit for oscillating said oscillatory contact shaft by the converted electric waves, an oscillatory main shaft, electro-magnetic power means on said main shaft, an energizing circuit for said electro-magnetic power means controlled by the movement of said contact shaft and motion-transmitting members connecting said main shaft and said recording element, whereby the relative movement of said recording element and material will be caused to vary in accordance with the variations of electric energy passing through said converted circuit.

24. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, magnetic means in said circuit for oscillating said oscillatory contact shaft by the converted electric waves, an oscillatory main shaft, electro-magnetic power means on said main shaft, an energizing circuit for said electro-magnetic power means controlled by the movement of said contact shaft and motion-transmitting members connecting said main shaft and said recording element, one of said members being disposed at an angle to the other, whereby the relative movement of said recording element and material will be caused to vary in accordance with the variations of electric energy passing through said converted circuit.

25. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, magnetic means in said circuit for oscillating said oscillatory contact shaft by the converted electric waves, an oscillatory main shaft, electro-magnetic power means on said main shaft, an energizing circuit for said electro-magnetic power means controlled by the movement of said contact shaft and motion-transmitting members connecting said main shaft and said recording element, one of said transmitting members being disposed at a right angle to the other, whereby the relative movement of said recording element and material will be caused to vary in accordance with the variations of electric energy passing through said converted circuit.

26. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, magnetic means in said circuit for oscillating said oscillatory contact shaft by the converted electric waves, an oscillatory main shaft, electro-magnetic power means on said main shaft, an energizing circuit for said electro-magnetic power means controlled by the movement of said contact shaft and motion-transmitting members connecting said main shaft and said recording element, one of said transmitting members being disposed at a right angle to the other, whereby the relative movement of said recording element and material will be caused to vary in accordance with the variations of electric energy passing through said converted circuit, an auxiliary shaft disposed at a right angle to said main shaft, means actuated by the main shaft for rocking said auxiliary shaft, a plurality of motion-transmitting members connecting said main and auxiliary shafts with said recording element.

27. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, an oscillatory main shaft, magnetic means in said circuit for oscillating said oscillatory main shaft, electro-magnetic power means on said main shaft, an energizing circuit for said electro-magnetic power means controlled by the movement of said contact shaft and motion-transmitting members connecting said main shaft and said recording element, one of said transmitting members being disposed at a right angle to the other, whereby the relative movement of said recording element and material will be caused to vary in accordance with the variations of electric energy passing through said converted circuit, an auxiliary shaft disposed at a right angle to said main shaft, means actuated by the main shaft for rocking said auxiliary shaft, a plurality of motion-transmitting members connecting said main and auxiliary shafts with said recording element, and means for rocking said auxiliary shaft to cause the recording element to traverse a sinuous path.

28. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, an oscillatory main shaft, magnetic means in said circuit for oscillating said oscillatory main shaft, electro-magnetic power means on said main shaft, an energizing circuit for said electro-magnetic power means controlled by the movement of said contact shaft and motion-transmitting members connecting said main shaft and said recording element, one of said transmitting members being disposed at a right angle to the other, whereby the relative movement of said recording element and material will be caused to vary in accordance with the variations of electric energy passing through said converted circuit, an auxiliary shaft disposed at a right angle to said main shaft, means actuated by the main shaft for rocking said auxiliary shaft, a plurality of motion-transmitting members connecting said main and auxiliary shafts with said recording element, a travelling element actuated by said main shaft and having a sliding connection with said auxiliary shaft to cause the same to be rocked, and a motion-transmission member connecting to said auxiliary shaft with the recording element to cause the latter to have a sinuous motion to cause one or a series of sine curves or a portion of such curve to be traced.

29. Apparatus for recording sound-waves embodying, in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, an oscillatory main shaft, magnetic means in said circuit for oscillating said oscillatory main shaft, electro-magnetic power means on said main shaft, an energizing circuit for said electro-magnetic power means controlled by the movement of said contact shaft and motion transmitting members connecting said main shaft and said recording element, one of said transmitting members being disposed at a right angle to the other, whereby the relative movement of said recording element and material will be caused to vary in accordance with the variations of electric energy passing through said converted circuit, an auxiliary shaft having a sinuous groove and disposed at a right angle to said main shaft, means actuated by the main shaft for rocking said auxiliary shaft, a plurality of motion-transmitting members connecting said main and auxiliary shafts with said recording element, a travelling element actuated by said main shaft and having a pin extending within said sinuous groove, and also having a sliding connection with said auxiliary shaft to cause the same to be rocked, and a motion-transmission member connecting to said auxiliary shaft with the recording element to cause the latter to have a sinuous motion to cause one or a series of sine curves or a portion of such curve to be traced.

30. Apparatus for recording sound-waves embodying. in combination, a vibratile sound-sensitive element, a recording element, a recording material, a contact shaft mounted for oscillatory movement, an electric circuit connected with said sound-sensitive element for converting sound-waves vibrating said element into electric waves of similar characteristics, an oscillatory main shaft, magnetic means in said circuit for oscillating said oscillatory main shaft, electro-magnetic power means on said main shaft, an energizing circuit for said electro-magnetic power means controlled by the movement of said contact shaft and motion-transmitting members connecting said main shaft and said recording element. one of said transmitting members being disposed at a right angle to the other, whereby the relative movement of said recording element and material will be caused to vary in accordance with the variations of electric energy passing through said converted circuit, an auxiliary shaft disposed at a right angle to said main shaft, means actuated by the main shaft for rocking said auxiliary shaft, a plurality of motion-transmitting members connecting said main and auxiliary shafts with said recording element, a travelling element actuated by said main shaft and having a sliding connection with said auxiliary shaft to cause the same to be rocked, and a motion-transmission member connecting to said auxiliary shaft with the recording element to cause the latter to have a sinuous motion to cause one or a series of sine curves or a portion of such curve to be traced.

In witness whereof, I have signed my name to the foregoing specification.

SEYED KHALIL.